(12) United States Patent
Jung et al.

(10) Patent No.: US 7,353,781 B2
(45) Date of Patent: Apr. 8, 2008

(54) ARRANGEMENT STRUCTURE OF HEAT EXCHANGER IN CONDENSING GAS BOILER

(75) Inventors: Yong Hyen Jung, Chungju-shi (KR); Woo Suk Hur, Pyeongtaek-Shi (KR)

(73) Assignee: Kyungdong Navien Co., Ltd, Gyonggi-do (KR)

( * ) Notice: Subject to any disclaimer, the term of this patent is extended or adjusted under 35 U.S.C. 154(b) by 1204 days.

(21) Appl. No.: 10/443,434

(22) Filed: May 22, 2003

(65) Prior Publication Data
US 2004/0031480 A1    Feb. 19, 2004

(30) Foreign Application Priority Data
May 23, 2002   (KR) .................. 10-2002-0028771
May 23, 2002   (KR) .................. 10-2002-0028772
May 23, 2002   (KR) .................. 10-2002-0028773

(51) Int. Cl.
*F22B 1/18* (2006.01)

(52) U.S. Cl. ............... 122/33; 122/18.1; 122/367.1; 122/31.1

(58) Field of Classification Search ........... 122/18.1, 122/32, 33, 367.1, 367.2; 126/101; 266/155; 110/254, 234
See application file for complete search history.

(56) References Cited

U.S. PATENT DOCUMENTS 4,502,626 A * 3/1985 Gerstmann et al. ........ 122/44.2

6,907,846 B2 * 6/2005 Hur et al. .................... 122/32

* cited by examiner

*Primary Examiner*—Gregory Wilson
(74) *Attorney, Agent, or Firm*—Devine, Millimet & Branch; Paul C. Remus

(57) ABSTRACT

An arrangement structure of heat exchangers in a condensing gas boiler is provided, which includes a casing provided with a combustion chamber therein, and a gas burner provided in the lower portion of the combustion chamber. The arrangement structure of heat exchangers in a condensing gas boiler includes: a present heat exchanger slantly arranged with a predetermined slope with respect to a horizontal axis on a transverse cross-section in the casing; a latent heat exchanger disposed in parallel with the present heat exchanger, in the same area as that of the present heat exchanger in the upper portion of the present heat exchanger; a condensed waterspout provided in parallel with between the present heat exchanger and the latent heat exchanger, whose one end contacts one of the inner wall surfaces of the casing and whose other end is disposed spaced from the other of the inner wall surfaces thereof; and an exhaust gas flowing plate provided in parallel with the outer wall of the latent heat exchanger, whose one end is spaced from one of the inner wall surfaces of the casing and whose other end contacts the other of the inner wall surfaces of the casing in order to induce condensed water and exhaust gas to flow in an identical direction. Thus, the heat transfer area is maximized, and present heat and condensing conditions are made to improve a heat exchanging efficiency, and to accomplish compactness and corrosion resistance of the boiler.

23 Claims, 9 Drawing Sheets

ARRANGEMENT STRUCTURE OF HEAT EXCHANGER IN CONDENSING GAS BOILER

BACKGROUND OF THE INVENTION

1. Field of the Invention

The present invention relates to an arrangement structure of heat exchangers in a condensing gas boiler, and more particularly, to an arrangement structure of heat exchangers in a condensing gas boiler which maximizes a heat transfer area and makes present heat and condensing conditions, to thereby improve a heat exchanging efficiency, and to then accomplish compactness and corrosion resistance of the boiler.

2. Description of the Related Art

A boiler for use in general homes and buildings is used for heating water and supplying hot water, which is divided into a fuel oil boiler and a fuel gas boiler, according to a type of a fuel used.

When a fuel oil boiler and a fuel gas boiler each having an identical capacity are compared with each other, the former is cheaper than the latter in view of its purchasing price, but the latter is more economic than the former in view of an amount of fuel consumed.

However, consumer's expenses are almost same on a long-term basis in both cases of a fuel oil boiler and a fuel gas boiler. Thus, fuel gas boilers are used in places where city gas is supplied, but fuel oil boilers are used in other places where city gas is not supplied.

Meanwhile, vapor generated in the course of burning gas contacts low-temperature matter or air to then be changed into water ($H_2O$). In this case, heat energy is created. A gas boiler, which is designed to re-absorb the generated heat in order to heighten a thermal efficiency, is called a condensing gas boiler. Such a condensing gas boiler has a thermal efficiency higher than that of an ordinary gas boiler and also can save a fuel cost remarkably. Accordingly, the condensing gas boilers are being widely used.

The condensing gas boiler uses combustion heat and directly heats circulation water, and re-absorbs condensed latent heat in exhaust gas, to thus heighten a thermal efficiency. Considering the thermal efficiency, the condensing gas boiler is made of a material of copper. However, an internal heat exchanger is corroded due to acid moisture generated at the time of a condensation process, and sulfuric oxide, nitric oxide, and combustion heat included in exhaust gas. To suppress it, aluminum or stainless steel having a corrosion-resistant property is used for the heat exchanger.

Although aluminum or stainless steel has a good corrosion-resistant property, its thermal efficiency is low. Thus, the heat exchanger should be designed largely in order to assume an identical calorie. As a result, the condensing gas boiler cannot be compact.

Also, the conventional condensing gas boiler is designed so that an area of a heat exchanger for a present heat portion differs from that of a heat exchanger for a latent heat portion, in order to identify a flowing direction of exhaust gas. As a result, a heat exchanging efficiency is reduced.

SUMMARY OF THE INVENTION

To solve the above problems, it is an object of the present invention to provide an arrangement structure of heat exchangers in a condensing gas boiler which maximizes a heat transfer area and makes present heat and condensing conditions to thereby improve a heat exchanging efficiency, and to then accomplish compactness and corrosion resistance of the boiler.

To accomplish the above object of the present invention, there is provided an arrangement structure of heat exchangers in a condensing gas boiler including a casing provided with a combustion chamber therein, and a gas burner provided in the lower portion of the combustion chamber, the arrangement structure of heat exchangers in a condensing gas boiler comprising: a present heat exchanger slantly arranged with a predetermined slope with respect to a horizontal axis on a transverse cross-section in the casing, so that present heat can be absorbed from the combustion heat generated by the gas burner; a latent heat exchanger disposed in parallel with the present heat exchanger, in the same area as that of the present heat exchanger in the upper portion of the present heat exchanger, so that the exhaust gas generated by combustion proceeds toward an exhaust gas exit which is formed penetratively on the upper portion of the casing; a condensed waterspout provided in parallel with between the present heat exchanger and the latent heat exchanger, whose one end contacts one of the inner wall surfaces of the casing and whose other end is disposed spaced from the other of the inner wall surfaces thereof; and an exhaust gas flowing plate provided in parallel with the outer wall of the latent heat exchanger, whose one end is spaced from one of the inner wall surfaces of the casing and whose other end contacts the other of the inner wall surfaces of the casing in order to induce condensed water and exhaust gas to flow in an identical direction.

Here, the present heat exchanger and the latent heat exchanger are formed of a double structure whose inner portion is made of tubes of a copper material and whose outer portion is made of tubes of an aluminum material. It is preferable that heat absorbing pins are formed on the outer circumferential surfaces of the outer aluminum-material tubes by a form rolling working.

Also, the present heat exchanger has a single structure in which the whole heat exchanger is formed of copper-material tubes. Heat absorbing pins are formed on the outer circumferential surfaces of the copper-material tubes by a form rolling working, and the latent heat exchanger is formed of a double structure whose inner portion is made of tubes of a copper material and whose outer portion is made of tubes of an aluminum material. Heat absorbing pins can be formed on the outer circumferential surfaces of the outer aluminum-material tubes by a form rolling working.

It is preferable that a plurality of exhaust gas resistant protrusions are formed spaced by a predetermined gap on the exhaust gas flowing plate, and protrude from the surface of the exhaust gas flowing plate, in order to suppress a flow of the exhaust gas.

At least one of the condensed waterspout and the exhaust gas flowing plate has a double layer of air, whose side walls are made of a heat isolation material.

A plurality of exhaust gas resistant bodies are further provided in the present heat exchanger in order to assist a heat exchanging efficiency.

Here, in the case that the inner portions of the plurality of exhaust gas resistance bodies are of hollow tubes, it is preferable that circulating water introduced into the present heat exchanger can be circulated between the present heat exchanger and the exhaust gas resistance bodies, by connecting the present heat exchanger and the exhaust gas resistance bodies with each other.

In particular, in the case that the exhaust gas resistance bodies are not used, it is preferable that part of the upper portions of the absorbing pins in the present heat exchanger are bent against a flowing direction of the exhaust gas, by a bending process.

An exhaust gas exit is integrally penetratively formed on the upper portion of the casing, to thus accomplish compactness of the boiler.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Figure 1:
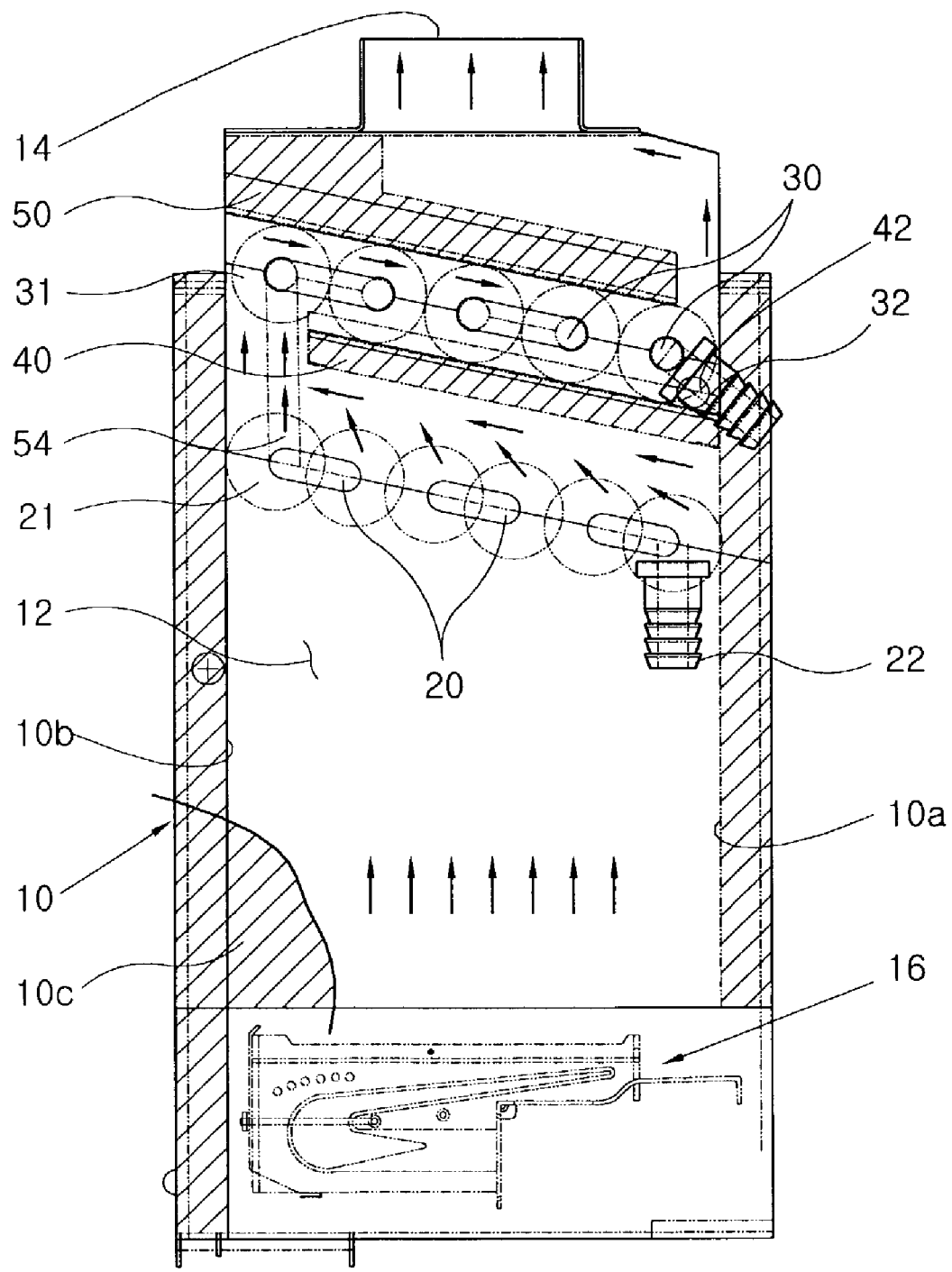
FIG. 1 is a configurational diagram schematically showing a condensing gas boiler according to an embodiment of the present invention.
Figure 2:
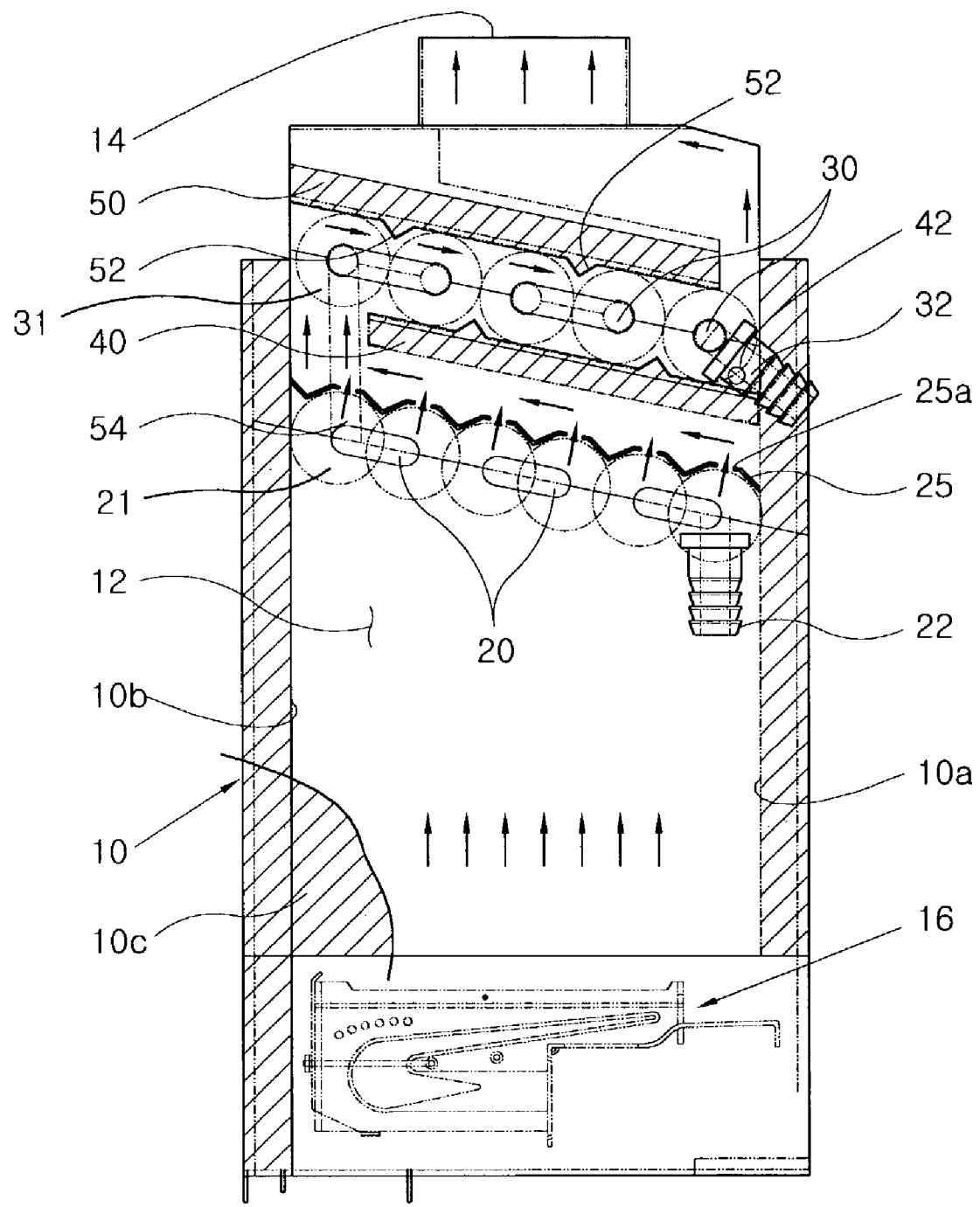
FIG. 2 is a configurational diagram schematically showing a condensing gas boiler according to another embodiment of the present invention.
Figure 3:
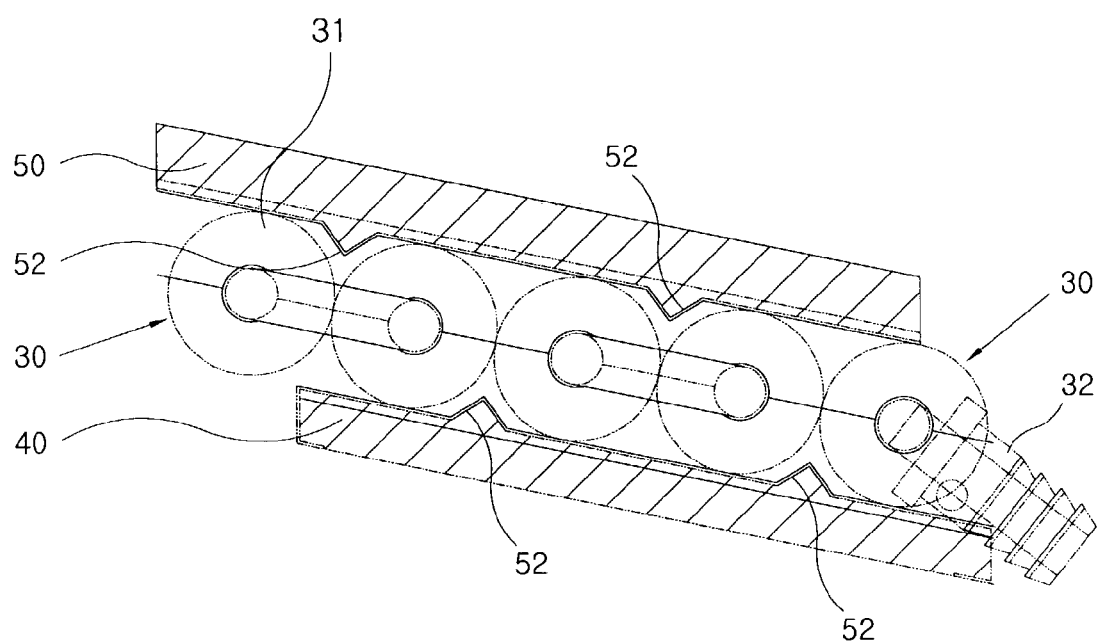
FIG. 3 is an enlarged configurational diagram schematically showing a heat exchanger region in the latent heat portion of FIG. 2.
Figure 4:
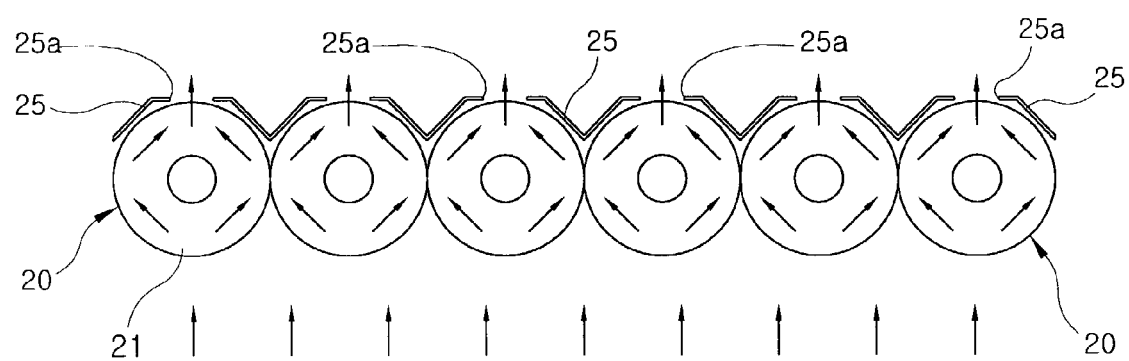
FIG. 4 is an enlarged configurational diagram schematically showing a heat exchanger region in the present heat portion of FIG. 2.

Preferred embodiments of the present invention will be described with reference to the accompanying drawings. The same or like elements are assigned with the same or like reference numerals.

As shown in FIGS. 1 through 4, a condensing gas boiler according to the present invention includes a casing 10 which forms an outer case and includes a combustion chamber 12 therein.

A heat isolation material 10c is filled in the side walls of the casing 10, in order to suppress heat in the combustion chamber 12 from being irradiated to thus heighten a combustion efficiency. An exhaust gas exit 14 is formed on the upper portion of the casing 10. In this embodiment, the exhaust gas exit 14 is integrally formed on the upper portion of the casing 10 toward a latent heat exchanger 30 to be described later, without a separate exhaust gas guiding plate (not shown). Thus, the present invention can achieve compactness of the boiler and save the manufacturing cost.

A gas burner 16 is provided below the combustion chamber 12 in the casing 10. The condensing gas boiler according to the present invention adopts an uptrend combustion type not a downtrend combustion type. Also, a Bunsen type burner can be used as the gas burner 16.

A present heat exchanger 20 is provided on the upper portion of the combustion chamber 12. The present heat exchanger 20 uses heat generated by combustion from the gas burner 16, and heats circulation water directly. The present heat exchanger 20 is disposed slantly with a predetermined slope with respect to a horizontal axial line on a cross-sectional surface of the casing 10, so that the exhaust gas can smoothly flow and also a heat transfer area can be maximized.

The inner portion of the present heat exchanger is made of a material of copper and the outer portion thereof is made of a material of aluminum, so that the present heat exchanger is of a double structure, to thereby possess a corrosion-resistant performance. Heat absorbing pins 21 are formed on the outer circumferential surface of the outer aluminum-material tubes, by a form rolling working method.

However, since the present heat exchanger 20 is not nearly influenced by corrosion due to the condensed water as being the case, the present heat exchanger 20 can be made of copper-material tubes which have an excellent heat exchanging efficiency through a single structure of integrating the inner and outer portions, not through the double structure of the inner and outer portions. Absorbing pins 21 can be formed on the outer circumferential surface of the present heat exchanger 20.

A circulation water exit adaptor 22 through which circulation water is discharged, is installed in one end of the present heat exchanger 20.

Meanwhile, a plurality of exhaust gas resistant bodies 25 are provided on the upper portion of the each present heat exchanger 20 so that a maximized heat exchanging efficiency is accomplished up to the rear surface of the present heat exchanger 20 according to the exhaust gas resistance.

That is, in the case that heat absorbing pins 21 are formed on the outer circumferential surface of the present heat exchanger 20 through a form rolling method, a flow of high-temperature exhaust gas cannot be maximized since there are no portions of playing a role of resistance against a flow of exhaust gas passing through the present heat exchanger 20.

Thus, the exhaust gas resistance bodies 25 are disposed between one heat absorbing pin 21 and the adjacent heat absorbing pin 21 on the upper portion of the present heat exchanger 20 in order to oppose a flowing direction of the exhaust gas.

Here, the respective exhaust gas resistant bodies 25 are disposed mutually spaced with a space 25a for flow of the exhaust gas, to form a shape of "V" substantially.

A latent heat exchanger 30 is provided on the upper portion of the present heat exchanger 20. The latent heat exchanger 30 is also disposed slantly with a predetermined slope with respect to a horizontal axial line on a cross-sectional surface of the casing 10, like the present heat exchanger 20.

Here, the latent heat exchanger 30 is disposed in the same area as that of the present heat exchanger 20, along the vertical direction in which combustion heat generated by the gas burner 16 proceeds toward the exhaust gas exit 14.

Thus, heat exchanging is accomplished in turn along the latent heat exchanger 30 during the time when the exhaust gas is discharged, to thus achieve maximized heat exchanging up to the end portions. As a result, the latent heat and condensing conditions due to the exhaust gas are made to thereby maximize the heat transfer area and to improve a heat exchanging efficiency, and to accomplish compactness of the boiler.

Also, since the latent heat exchanger 30 can be easily corroded due to the condensed water, the inner portion of the latent heat exchanger 30 is made of a material of copper and the outer portion thereof is made of a material of aluminum, to thus have a double structure and to thereby possess a corrosion-resistant performance, like the present heat exchanger 20. It is preferable that heat absorbing pins 31 are formed on the outer circumferential surface of the outer aluminum-material tubes by a form rolling working method.

In this embodiment, the latent heat exchanger 30 is arranged in a line along the lateral direction of the boiler. However, the latent heat exchanger 30 can be arranged in a two-stage configuration, a multiple structure, and a multiple arrangement form. Also, the latent heat exchanger 30 can be separately arranged as desired.

A circulation water entrance adaptor 32 through which circulation water goes in, is provided in one end of the latent heat exchanger 30. A mutual connector 54 is provided between the other end of the latent heat exchanger 30 and that of the present heat exchanger 20. The connector 54 can connect the present heat exchanger 20 and the latent heat exchanger 30, in a way differing from the way shown in FIG. 1.

A condensed waterspout 40 is provided in parallel between the present heat exchanger 20 and the latent heat exchanger 30, in which one end of the condensed waterspout 40 contacts an internal one wall surface 10a of the casing 10, and the other end thereof is disposed spaced from the other internal wall surface 10b. Exhaust gas can flow through a space disposed spaced from the other internal wall surface 10b. A condensed water exit 42 for discharging the condensed water generated in the heat exchanging process of the latent heat exchanger 30 and collected in the condensed waterspout 40 is formed in one end of the condensed waterspout 40.

An exhaust gas flowing plate 50 is provided on the external wall of the latent heat exchanger 30, in order to guide the exhaust gas having flown through the present heat exchanger 20.

The exhaust gas flowing plate 50 plays a role of a flowing path of the exhaust gas which introduces the flow of the exhaust gas to be identical with the direction at which the condensed water drops between the exhaust gas flowing plate 50 and the latent heat exchanger 30.

Here, one end of the exhaust gas flowing plate 50 is spaced from an internal one wall surface 10a of the casing 10, and the other end thereof contacts the other internal wall surface 10b of the casing 10, and thus the exhaust gas flowing plate 50 is provided in parallel with the latent heat exchanger 30.

The condensed waterspout 40 and the exhaust gas flowing plate 50 has a double layer of air, whose side walls are made of a heat isolation material.

Meanwhile, a plurality of exhaust gas resistant protrusions 52 are formed on the condensed waterspout 40 and the exhaust gas flowing plate 50, in which the protrusions 52 are spaced by a predetermined interval on the exhaust gas flowing plate 50, and protruded from the surface of the exhaust gas flowing plate 50, toward the latent heat exchanger 30, so that heat exchanging can be accomplished in all the areas of the latent heat exchanger 30.

The exhaust gas resistant protrusions 52 can suppress flow of the exhaust gas, at maximum, to thereby heighten a heat exchanging efficiency of the latent heat exchanger 30.

The condensed waterspout 40 and the exhaust gas flowing plate 50 are also disposed slantly like the present heat exchanger 20 and the latent heat exchanger 30.

By the above configuration, when the heating gas burner is activated to burn fuel, exhaust gas having passed through the present heat exchanger 20 passes through a space 25a near the exhaust gas resistant bodies 25 disposed spaced by a predetermined interval, and advances toward the condensed waterspout 40. The exhaust gas is induced from the lower portion of the condensed waterspout 40 through a gap spaced from the other wall surface 10b of the casing 10.

The induced exhaust gas is heat-exchanged in turn in the latent heat exchanger 30 installed below the exhaust gas flowing plate 50. Here, a heat exchanging efficiency of the latent heat exchanger 30 can be further heightened due to each exhaust gas resistant protrusion 52 provided in the condensed waterspout 40 and the exhaust gas flowing plate 50. The condensed water generated in the heat exchanging process of the latent heat exchanger 30 is collected in the condensed waterspout 40, and discharged through the condensed water exit 42.

The exhaust gas which has been heat-exchanged in turn in the latent heat exchanger 30 is induced through a gap formed between one end of the exhaust gas flowing plate 50 and the internal wall surface 10a in the casing 10, and then goes up and discharged through the upper exhaust gas exit 14.

As described above, the condensing gas boiler according to the present invention maximizes the heat transfer area and makes resent heat and condensing conditions, to thus improve a heat exchanging efficiency, and to accomplish compactness and corrosion resistance of the boiler.

Meanwhile, FIGS. 5A through 5E show various embodiments of exhaust gas resistant bodies provided in the heat exchanger within the present heat portion.

Figure 5A:
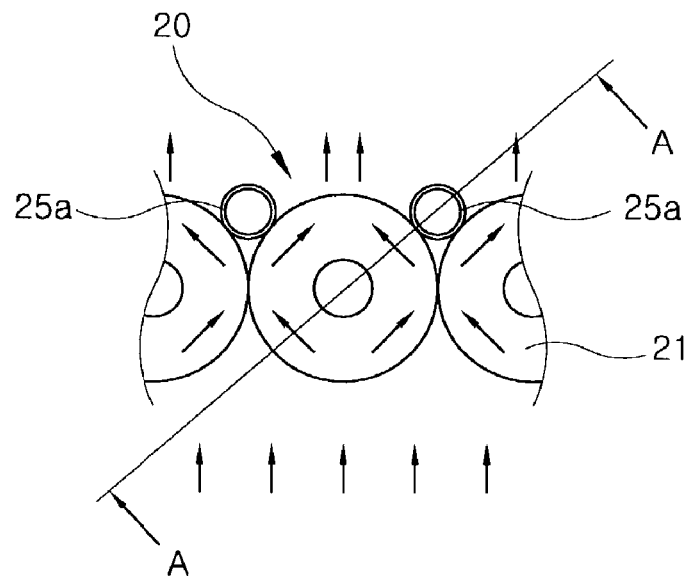
FIGS. 5A through 5E show various embodiments of exhaust gas resistant bodies provided in the heat exchanger within the present heat portion.
Figure 5B:
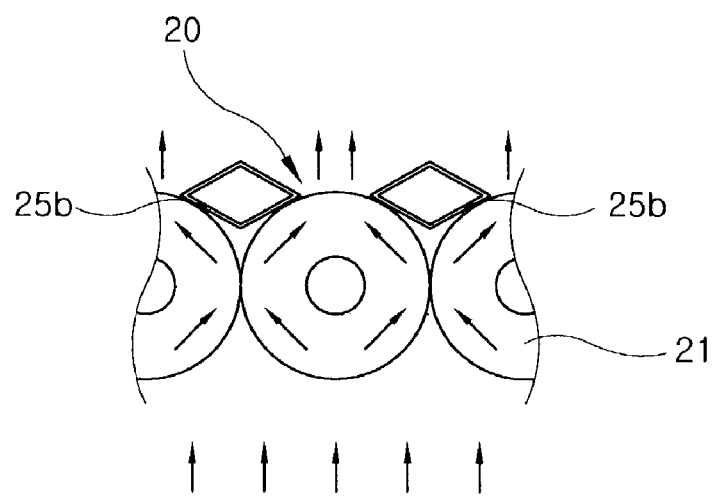
Figure 5C:
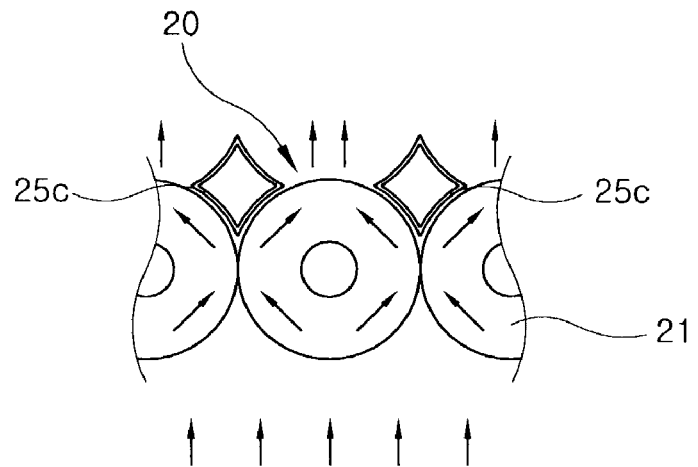
Figure 5D:
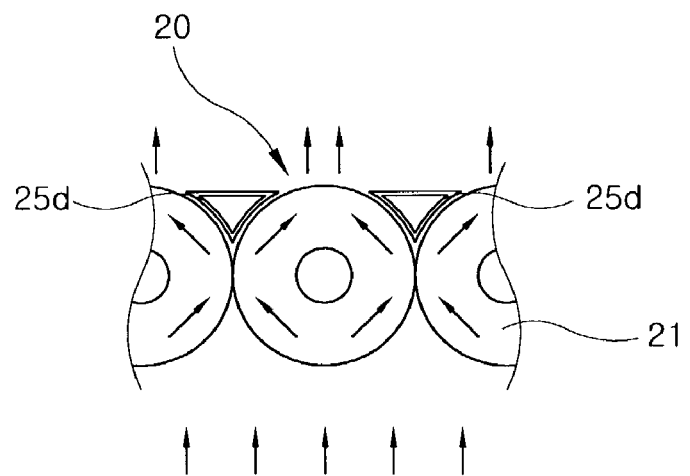
Figure 5E:
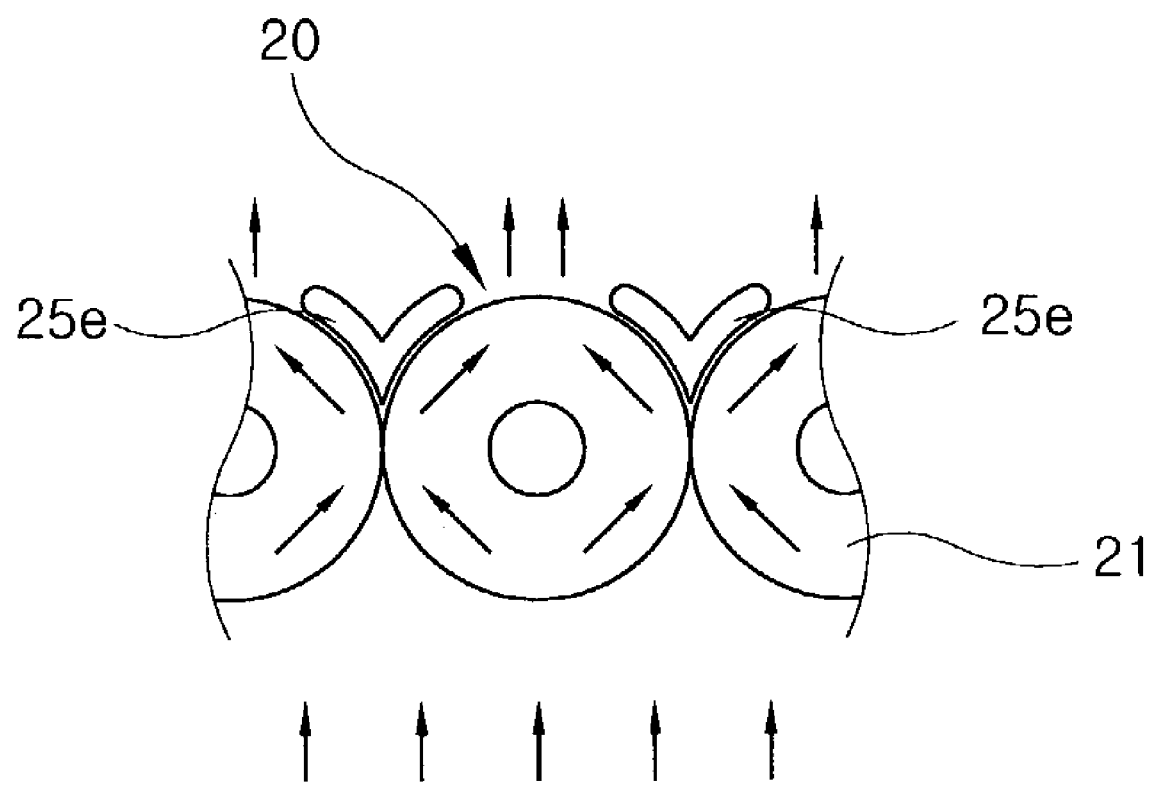

That is, the exhaust gas resistant bodies 25a shown in FIG. 5A are formed of a circle, respectively. The exhaust gas resistant bodies 25b shown in FIG. 5B are formed of a lozenge, respectively. The exhaust gas resistant bodies 25c shown in FIG. 5C are formed of a lozenge of which sides are curved, respectively. The exhaust gas resistant bodies 25d shown in FIG. 5D are formed of an inverted triangle, respectively. The exhaust gas resistant bodies 25e shown in FIG. 5E are formed of a "V" shape, respectively.

The exhaust gas resistant bodies 25a through 25e also have a gap (not shown) through which exhaust gas can flow there between. The exhaust gas resistant bodies are employed in order to heighten a heat exchanging efficiency in the present heat exchanger 20. Thus, the other shapes of the exhaust gas resistant bodies can be employed.

Figure 6:
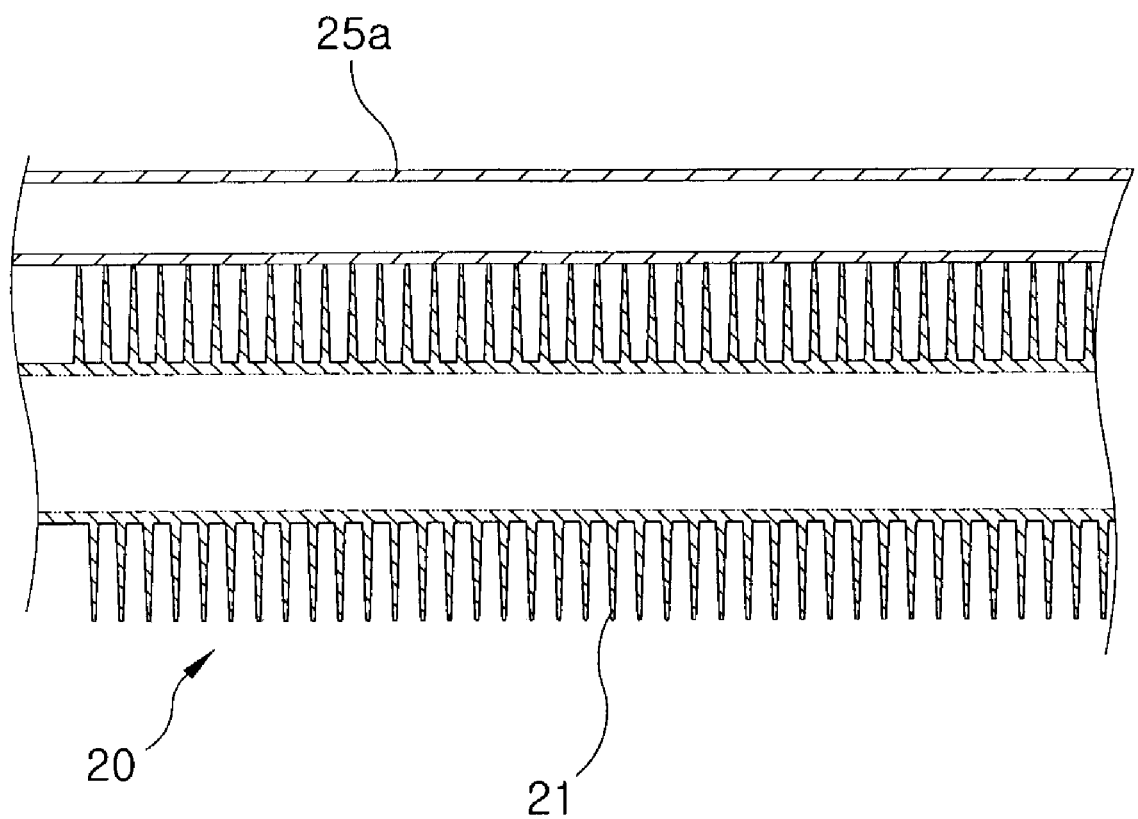
FIG. 6 is a cross-sectional view of a line A-A in FIG. 5A, showing an arrangement structure of the heat exchanger in the present heat portion and the exhaust gas resistant bodies.

In particular, as shown in FIG. 6, since the inner portions of the exhaust gas resistance bodies 25a-25e are of hollow tubes, the exhaust gas resistance bodies 25a-25e are configured such that circulating water introduced into the present heat exchanger 20 can be branched off and circulated.

That is, if circulating water is circulated between the exhaust gas resistance bodies 25a-25e and the present heat exchanger 20, the circulating water introduced into the present heat exchanger 20 via the latent heat exchanger 30 is also branched off in the inner portions of the exhaust gas resistance bodies 25a-25e. The circulating water flowing through the inner portions of the exhaust gas resistance bodies 25a-25e absorb heat from the exhaust gas contacting the outer circumferential surface of the exhaust gas resistance bodies 25a-25e, and is heated. Then, the heated circulating water is mixed with circulating water flowing in the present heat exchanger 20 and the mixed circulating water is circulated.

Thus, a heat exchanging process occurs even in the exhaust gas resistance bodies 25a-25e. As a result, a heat exchanging area becomes large to thereby absorb latent heat from the exhaust gas at maximum, and thus further enhance a heat exchanging efficiency.

Figure 7:
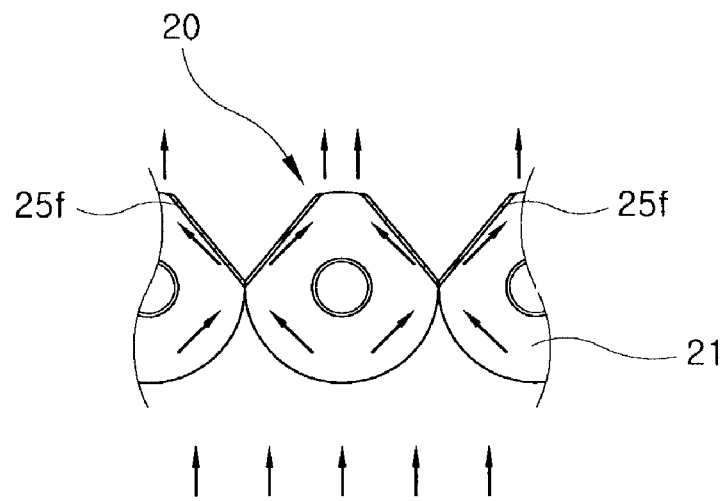
FIG. 7 is a cross-sectional view showing a state of bending part of heat absorbing pins formed on the outer circumferential surface of the heat exchanger in the present heat portion, according to still another embodiment of the present invention.
Figure 8:
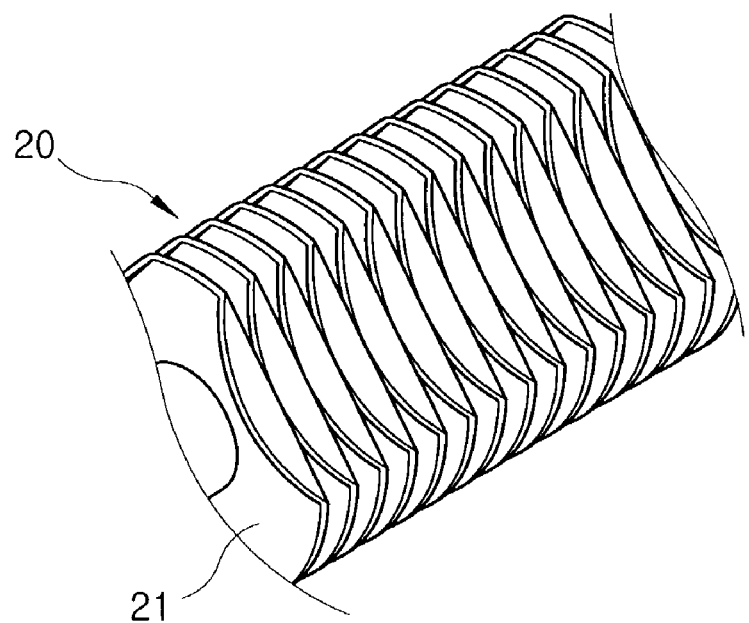
FIG. 8 is a perspective view showing a state of bending part of heat absorbing pins formed on the outer circumferential surface of the heat exchanger in the present heat portion, according to still another embodiment of the present invention.

Also, FIGS. 7 and 8 show another embodiment of the present invention. In the FIGS. 7 and 8 embodiments, no additional exhaust gas resistance bodies are not installed. Instead, part of the upper portions of the heat absorbing pins 21 formed on the outer circumferential surface of the present heat exchanger 20 are bent against a flowing direction of the exhaust gas, by a bending process, in a manner that the bent portions of the heat absorbing pins 21 play a role of part of the exhaust gas resistance bodies, respectively. As a result, a heat exchanging efficiency can be enhanced through a simple bent structure of the heat absorbing pins 21.

It is of course possible that a structure of bending part of the heat absorbing pins 21 to become bent can be applied to the heat absorbing pins 31 in the latent heat exchanger 30.

In particular, it is of course possible that the exhaust gas resistance bodies 25a-25e can be modified into the other shapes differing from the FIGS. 7 and 8 embodiments.

The present heat exchanger 20 and the latent heat exchanger 30 are mutually spaced along the height direction in the above-described embodiment. However, they can be overlapped according to size of the combustion chamber.

Also, the present heat exchanger and the latent heat exchanger are connected to each other by a connector, but can be separated from each other.

As described above, the present invention provides an arrangement of heat exchangers in a condensing gas boiler. By configuration of the present invention, the present heat exchanger and the latent heat exchanger are installed in parallel with each other, and with a predetermined slope with respect to the vertical direction of the casing, to thereby introduce a flow of exhaust gas to be identical with a direction at which the condensed water drops. Also, exhaust gas resistance bodies are installed in the present heat exchanger on which heat absorbing pins are worked with a form rolling method, in which the heat transfer area is maximized, and present heat and condensing conditions are made to improve a heat exchanging efficiency, and to accomplish compactness and corrosion resistance of the boiler.

The present invention is not limited in the above-described embodiments. It is apparent to one who is skilled in the art that there are many variations and modifications without departing off the spirit of the present invention and the scope of the appended claims.

What is claimed is:

1. An arrangement structure of heat exchangers in a condensing gas boiler including a casing provided with a combustion chamber therein, and a gas burner provided in the lower portion of the combustion chamber, the arrangement structure of heat exchangers in a condensing gas boiler comprising:

a present heat exchanger slantly arranged with a predetermined slope with respect to a horizontal axis on a transverse cross-section in the casing, so that present heat can be absorbed from the combustion heat generated by the gas burner;

a latent heat exchanger disposed in parallel with the present heat exchanger, in the same area as that of the present heat exchanger in the upper portion of the present heat exchanger, so that the exhaust gas generated by combustion proceeds toward an exhaust gas exit which is formed penetratively on the upper portion of the casing;

a condensed waterspout provided in parallel with between the present heat exchanger and the latent heat exchanger, whose one end contacts one of the inner wall surfaces of the casing and whose other end is disposed spaced from the other of the inner wall surfaces thereof; and an exhaust gas flowing plate provided in parallel with the outer wall of the latent heat exchanger, whose one end is spaced from one of the inner wall surfaces of the casing and whose other end contacts the other of the inner wall surfaces of the casing in order to induce condensed water and exhaust gas to flow in an identical direction.

2. The arrangement structure of heat exchangers in a condensing gas boiler of claim 1, further comprising a plurality of exhaust gas resistant bodies in the present heat exchanger in order to assist a heat exchanging efficiency.

3. The arrangement structure of heat exchangers in a condensing gas boiler of claim 2, wherein in the case that the inner portions of the plurality of exhaust gas resistance bodies are of hollow tubes, circulating water introduced into the present heat exchanger can be circulated between the present heat exchanger and the exhaust gas resistance bodies, by connecting the present heat exchanger and the exhaust gas resistance bodies with each other.

4. The arrangement structure of heat exchangers in a condensing gas boiler of claim 2, wherein a plurality of exhaust gas resistant protrusions are formed spaced by a predetermined gap on the exhaust gas flowing plate, and protrude from the surface of the exhaust gas flowing plate, in order to suppress a flow of the exhaust gas.

5. The arrangement structure of heat exchangers in a condensing gas boiler of claim 4, wherein at least one of the condensed waterspout and the exhaust gas flowing plate has a double layer of air, whose side walls are made of a heat isolation material.

6. The arrangement structure of heat exchangers in a condensing gas boiler of claim 1, wherein a plurality of exhaust gas resistant protrusions are formed spaced by a predetermined interval on the exhaust gas flowing plate, and protruded from the surface of the exhaust gas flowing plate, in order to suppress a flow of the exhaust gas.

7. The arrangement structure of heat exchangers in a condensing gas boiler of claim 6, wherein at least one of the condensed waterspout and the exhaust gas flowing plate has a double layer of air, whose side walls are made of a heat isolation material.

8. The arrangement structure of heat exchangers in a condensing gas boiler of claim 1, wherein the present heat exchanger and the latent heat exchanger are formed of a double structure whose inner portion is made of tubes of a copper material and whose outer portion is made of tubes of an aluminum material, in which heat absorbing pins are formed on the outer circumferential surfaces of the outer aluminum-material tubes by a form rolling working.

9. The arrangement structure of heat exchangers in a condensing gas boiler of claim 8, further comprising a plurality of exhaust gas resistant bodies in the present heat exchanger in order to assist a heat exchanging efficiency.

10. The arrangement structure of heat exchangers in a condensing gas boiler of claim 9, wherein in the case that the inner portions of the plurality of exhaust gas resistance bodies are of hollow tubes, it is preferable that circulating water introduced into the present heat exchanger can be circulated between the present heat exchanger and the exhaust gas resistance bodies, by connecting the present heat exchanger and the exhaust gas resistance bodies with each other.

11. The arrangement structure of heat exchangers in a condensing gas boiler of claim 9, wherein a plurality of exhaust gas resistant protrusions are formed spaced by a predetermined gap on the exhaust gas flowing plate, and protrude from the surface of the exhaust gas flowing plate, in order to suppress a flow of the exhaust gas.

12. The arrangement structure of heat exchangers in a condensing gas boiler of claim 11, wherein at least one of the condensed waterspout and the exhaust gas flowing plate has a double layer of air, whose side walls are made of a heat isolation material.

13. The arrangement structure of heat exchangers in a condensing gas boiler of claim 8, wherein a plurality of exhaust gas resistant protrusions are formed spaced by a predetermined gap on the exhaust gas flowing plate, and protrude from the surface of the exhaust gas flowing plate, in order to suppress a flow of the exhaust gas.

14. The arrangement structure of heat exchangers in a condensing gas boiler of claim 13, wherein at least one of the condensed waterspout and the exhaust gas flowing plate has a double layer of air, whose side walls are made of a heat isolation material.

15. The arrangement structure of heat exchangers in a condensing gas boiler of claim 8, wherein part of the upper portions of the absorbing pins in the present heat exchanger are bent against a flowing direction of the exhaust gas, by a bending process.

16. The arrangement structure of heat exchangers in a condensing gas boiler of claim 1, wherein the present heat exchanger has a single structure in which the whole heat exchanger is formed of copper-material tubes, in which heat absorbing pins are formed on the outer circumferential surfaces of the copper-material tubes by a form rolling working method, and the latent heat exchanger is formed of a double structure whose inner portion is made of tubes of a copper material and whose outer portion is made of tubes of an aluminum material in which heat absorbing pins can be formed on the outer circumferential surfaces of the outer aluminum-material tubes by a form rolling working method.

17. The arrangement structure of heat exchangers in a condensing gas boiler of claim 16, further comprising a plurality of exhaust gas resistant bodies in the present heat exchanger in order to assist a heat exchanging efficiency.

18. The arrangement structure of heat exchangers in a condensing gas boiler of claim 17, wherein in the case that the inner portions of the plurality of exhaust gas resistance bodies are of hollow tubes, circulating water introduced into the present heat exchanger can be circulated between the present heat exchanger and the exhaust gas resistance bodies, by connecting the present heat exchanger and the exhaust gas resistance bodies with each other.

19. The arrangement structure of heat exchangers in a condensing gas boiler of claim 17, wherein a plurality of exhaust gas resistant protrusions are formed spaced by a predetermined gap on the exhaust gas flowing plate, and protrude from the surface of the exhaust gas flowing plate, in order to suppress a flow of the exhaust gas.

20. The arrangement structure of heat exchangers in a condensing gas boiler of claim 19, wherein at least one of the condensed waterspout and the exhaust gas flowing plate has a double layer of air, whose side walls are made of a heat isolation material.

21. The arrangement structure of heat exchangers in a condensing gas boiler of claim 16, wherein a plurality of exhaust gas resistant protrusions are formed spaced by a predetermined gap on the exhaust gas flowing plate, and protrude from the surface of the exhaust gas flowing plate, in order to suppress a flow of the exhaust gas.

22. The arrangement structure of heat exchangers in a condensing gas boiler of claim 21, wherein at least one of the condensed waterspout and the exhaust gas flowing plate has a double layer of air, whose side walls are made of a heat isolation material.

23. The arrangement structure of heat exchangers in a condensing gas boiler of claim 16, wherein part of the upper portions of the absorbing pins in the present heat exchanger are bent against a flowing direction of the exhaust gas, by a bending process.

* * * * *